United States Patent [19]

Sato

[11] Patent Number: 4,753,996
[45] Date of Patent: Jun. 28, 1988

[54] HEAT-RESISTANT METHACRYLIC RESIN COMPOSITION

[75] Inventor: Fumio Sato, Otake, Japan

[73] Assignee: Mitsubishi Rayon Co., Ltd., Japan

[21] Appl. No.: 882,598

[22] Filed: Jul. 7, 1986

[30] Foreign Application Priority Data

Jul. 8, 1985 [JP] Japan ................................ 60-149639

[51] Int. Cl.$^4$ ........................ C08L 35/06; C08L 33/12
[52] U.S. Cl. ..................................... 525/205; 525/207
[58] Field of Search ......................................... 525/205

[56] References Cited

U.S. PATENT DOCUMENTS 3,676,404  7/1972  Nield .
4,558,098  12/1985  Kamata et al. .

FOREIGN PATENT DOCUMENTS 2207154  6/1974  France .

OTHER PUBLICATIONS

Patent Abstract of Japan, vol. 8, No. 62 (C-215) [1499], Mar. 23, 1984; and JP-A-58 217 537 (Mitsubishi Monsanto Kasei K.K.) 17-12-1983.

*Primary Examiner*—Carman J. Seccuro
*Attorney, Agent, or Firm*—Brumbaugh, Graves, Donohue & Raymond

[57] ABSTRACT

A transparent heat-resistant methacrylic resin composition comprising 1 to 99% by weight of a copolymer (I) obtained by polymerizing a monomer mixture of 98 to 40% by weight of methyl methacrylate, 1 to 30% by weight of an N-substituted maleimide, and 1 to 30% by weight of an aromatic vinyl monomer and 99 to 1% by weight of a copolymer (II) containing at least 70% by weight of methyl methacrylate.

6 Claims, 1 Drawing Sheet

HEAT-RESISTANT METHACRYLIC RESIN COMPOSITION

BACKGROUND OF THE INVENTION

The present invention relates to a transparent heat-resistant methacrylic resin composition.

DESCRIPTION OF THE PRIOR ART

Methacrylic resins containing methyl methacrylate as the main component are excellent in optical properties and weathering resistance and also have relatively well-balanced performances in mechanical properties, thermal properties, and molding processability. Taking advantage of these characteristics, these resins are widely used in many fields of commercial products including sign boards, covers for illumination, nameplates, automobile parts, parts for electrical instruments, ornaments, miscellaneous goods, etc. Further developments for use of these resins are in progress.

In one aspect, however, these resins are insufficient in heat resistance, as exhibiting heat distortion temperatures of most 100° C., so that in a considerable number of fields the development of their use is restricted. Thus there is persistent demand for improvement of these resins in heat resistance.

A number of methods are already proposed for improving methacrylic resins in heat resistance, including, for example, a method comprising copolymerization of methyl methacrylate and α-methylstyrene, a method comprising copolymerization of methyl methacrylate, α-methylstyrene and maleic anhydride (Japanese Patent Publication No. 10156/74), a method comprising copolymerization of methyl methacrylate, styrene, and maleic anhydride (Japanese Patent Publication No. 43242/81), a method comprising copolymerization of methyl methacrylate, α-methylstyrene, styrene, and maleic anhydride (Japanese Patent Application Laid-Open No. 81322/81), a method comprising dissolving poly-α-methylstyrene in methyl methacrylate, followed by polymerizing this methyl methacrylate (Japanese Patent Publication Nos. 1616/68 and 8718/74), a method comprising copolymerization of methyl methacrylate and N-arylmaleimide (Japanese Patent Publication No. 9753/68), a method comprising copolymerization of methyl methacrylate, α-methylstyrene, and maleimide (U.S. Pat. No. 3,480,598 and U.S. Pat. No. 3,676,404), a method comprising copolymerization of methyl methacrylate in the presence of a crosslinked polymer produced from a polyfunctional monomer, a method comprising copolymerization of methyl methacrylate and methacrylic acid, and a method comprising copolymerization of methyl methacrylate, α-methylstyrene, and acrylonitrile.

According to the above proposed methods, the productivity may be too low for practical application because of the extremely low rate of polymerization; the resulting resin may have poorer mechanical properties, weathering resistance, or optical properties; the molded products may be markedly colored; or the molding processability may be poor due to narrow molding region. Thus, although the heat resistance is improved to some extent by any of the above methods, a number of problems remain to be solved.

SUMMARY OF THE INVENTION

The object of the present invention is to provide a heat-resistant methacrylic resin composition superior in productivity without any deterioration of excellent performances, which are inherent in methacrylic resin, such as optical properties, mechanical properties, weathering resistance, and molding processability.

DESCRIPTION OF THE PREFERRED EMBODIMENT

As a result of studies for achieving the above object, it has been found that a resin blend comprising (i) a copolymer constituted of methyl methacrylate, N-substituted maleimide, and aromatic vinyl monomer units which has a specific composition and (ii) a copolymer constituted of at least 70% by weight of methyl methacrylate monomer units is unexpectedly superior in mechanical properties, molding processability, and productivity to a single copolymer having the same composition as that of the resin blend and is also good in transparency in spite of the difference in refractive index between the two component copolymers.

The substance of the present invention is a heat-resistant methacrylic resin composition comprising 1 to 99% by weight of a copolymer (I) obtained by polymerizing a monomer mixture of (A) 40 to 98% by weight of methyl methacrylate, (B) 1 to 30% by weight of an N-substituted maleimide and (C) 1 to 30% by weight of an aromatic vinyl monomer and 99 to 1% by weight of a polymer (II) containing at least 70% by weight of methyl methacrylate.

The greatest characteristic of the present invention is that the above-defined heat-resistant copolymer (I) having a specific composition and the above-defined copolymer (II) constituted mainly of methyl methacrylate are blended into a uniform dispersion, thereby yielding unexpectedly a composition which is excellent in weathering resistance and in the colorlessness and transparency of molded products thereof and further is extremely well-balanced in heat resistance and processability, as compared with copolymers disclosed in the above-cited Japanese Patent Publication No. 9753/68, U.S. Pat. No. 3,676,407, etc. In particular, a salient feature of the present inventive composition is that its heat distortion temperature is at least 105° C. and generally 110° C. or higher.

In the composition of the present invention, methyl methacrylate or its partially polymerized monomer mixture constituting the copolymer (I) serves to maintain the optical properties, weathering resistance and mechanical properties inherent in methacrylic resins and improve the compatibility for the copolymer (II). Copolymer (I) contains 40 to 98% by weight of methyl methacrylate unit. When this amount is less than 40% by weight, the above-mentioned properties will be lost, and when the amount exceeds 98% by weight, the improvement of heat resistance will not be achieved.

The N-substituted maleimide, a constituent of the copolymer (I), mainly acts as a heat-resistance improver and its content in the copolymer (I) is 1 to 30%, preferably 3 to 25%, by weight. When the content is less than 1% by weight, the copolymer (I) will be inferior in heat resistance. The content exceeding 30% by weight tends to make the resin composition brittle, and the polymerization system for such a content tends to be unstable, hence lowering the productivity.

Suitable N-substituted maleimides for use in the present invention include, for example, N-alkyl maleimides, N-arylmaleimides, N-aralkylmaleimides, and N-cycloalkylmaleimides. From the viewpoint of the heat-resistance improving effect and availability, it is preferable to use an N-alkylmaleimide having 1 to 4 carbon atoms in the substituent, N-phenylmaleimide, or an N-(substituted phenyl)maleimide represented by the formula

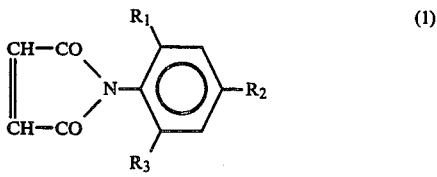

wherein each of $R_1$, $R_2$, and $R_3$ denotes hydrogen, alkyl of 1 to 4 carbon atoms, or halogen. N-Cyclohexylmaleimide is particularly preferred from the viewpoint of the function of copolymerizing with methyl methacrylate and the colorless transparency.

The aromatic vinyl monomer, which may have some synergistic effect of improving the heat resistance, will serve basically to enhance the copolymerization reactivity of N-substituted maleimide, consequently decreasing the amount of residual monomer in the copolymer, thereby improving indirectly the heat resistance and bringing about marked improving effect on the productivity. In addition, improvements of the copolymer (I) in flow properties and compability with the copolymer (II) are brought about by this constituent. In other words, the mixture of a methyl methacrylate/N-substituted maleimide copolymer and the copolymer (II) shows neither improved heat resistance nor synergistically enhanced mechanical property and also has poor compatibility and hence appears hazy, thus being inferior in optical properties.

It is supprising that a transparent resin composition excellent in physical properties has been obtained by the method according to the present invention, in view of the fact that mixtures of a methyl methacrylate/aromatic vinyl compound copolymer and the copolymer (II) are poor in the compatability of the two component copolymers and therefore are generally opague.

Examples of the aromatic vinyl monomer used in the present invention are styrene, o-, m-, or p-methylstyrene, 1,4-dimethylstyrene, 2,4-dimethylstyrene, p-t-butylstyrene, α-methylstyrene, α-ethylstyrene, and α-methyl-p-methylstyrene and their halide derivatives such as o-, m-, or p-chlorostyrene, 2,4-dibromostyrene, and 2-methyl-4-chlorostyrene. Of these, preferred is at least one member selected from the group consisting of styrene, vinyltoluene, and α-methylstyrene and particularly preferred is α-methylstyrene, which is highly effective for improving the heat resistance.

The proportion of the aromatic vinyl monomer unit in the copolymer (I) for the purpose of producing the above stated effects is in the range of 1 to 30%, preferably 2 to 20%, particularly preferably 2 to 15%, by weight.

When the proportion is less than 1% by weight, the synergistic effect will not be observed, and on the contrary when the proportion exceeds 30% by weight, the compatibility with the copolymer (II) will be deteriorated and hence the transparency of the final resin composition will be inferior.

In the composition of the present invention, when considering the final resin properties as a whole, such as heat resistance, mechanical properties, optical properties, and molding processability, it is preferred that the copolymer (I) would have a composition satisfying the quantitative relationship in terms of moldes α of N-substituted maleimide unit, moles β of aromatic vinyl monomer unit, so that the ratio β/α of respective component may be in the range from 0.2 to 5 and more preferably from 0.5 to 2 from the viewpoint of the synerigistic effect. When said ratio is out of the range of 0.2 to 5, a decrease in the compatibility with the copolymer (II) will be observed and hence the transparency tends to lower.

The copolymer (II) which is a component of the resin composition of the present invention is for the purpose of imparting the weathering resistance, mechanical properties, optical properties and molding processability inherent in methacrylic resins. Methyl methacrylate which is the main constituent of the copolymer (II) is for the purpose of imparting the weathering resistance, optical properties, and mechanical properties inherent in methacrylic resins. When the content of methyl methacrylate is less than 70% by weight, the above-mentioned properties will be deteriorated. Preferably the content is at least 80% by weight. Suitable monomers for the copolymerization with methyl methacrylate include; acrylates such as methyl acrylate and ethyl acrylate; methacrylates such as ethyl methacrylate and butyl methacrylate; and styrene, acrylonitrile, and maleic anhydride. One or more of these monomers are copolymerized in an amount of up to 30%, preferably, up to 20%, by weight.

The proportion of the copolymer (I), a component of the resin composition of the present invention is 1 to 99%, preferably 5 to 95%, by weight of the composition. When the proportion is less than 1% by weight, the composition will be inferior in heat resistance. When the proportion exceeds 99% by weight, the composition will be inferior in mechanical properties and weathering resistance.

The proportion of the copolymer (II) in the resin composition is 1 to 99%, preferably 5 to 95%, particularly preferably 10 to 90%, by weight. When this proportion is less than 1% by weight, the composition will be inferior in mechanical properties and weathering resistance. When this proportion exceeds 99%, the improvement of the composition in heat resistance will not be expectable.

The composition of the present invention may be used, for example, for sheet products. The use as materials for molding is another favorable example. The present composition is useful in particular as molding compounds having flow rates (FR) (ASTM D-1238, the amount of resin extruded in grams at 230° C. under a load of 10 kg/cm$^2$, for ten minutes) of 0.5 to 75 g/10 minutes.

The process for producing the composition of the present invention undergoes no particular restriction. For instance, the composition may be produced by; a process comprising preparation of the copolymer (I) according to the normal way of bulk polymerization or suspension polymerization, blending the prepared copolymer (I) with the copolymer (II), and melting, melt-mixing, and extruding the mixture at temperatures between 200° and 300° C. to form a resin compound; a process comprising dissolving the copolymer (I) in a mixture of monomers which will constitute the copolymer (II), dispersing the solution in dispersant-containing water, and subjecting the dispersion to suspension polymerization, or subjecting the above solution to bulk polymerization; or a process comprising dissolving the copolymer (II) in a mixture of monomers which will constitute the copolymer (I), and subjecting the solution to bulk polymerization.

In the resin composition of the present invention may be added such additives, if necessary, as an ultraviolet absorber, peeling agents, antioxidant agents, mold-releasing agents, and dyes or pigments.

EXAMPLES

The present invention is illustrated in more detail with reference to the following examples. In the examples, parts are all by weight.

In the examples, properties of resin compositions were evaluated in the following ways.

(1) Tensile strength and elongation
ASTM D-638
(2) Izod impact strength
ASTM D-256
(3) Heat resistance
Heat distortion temperature (HDT) (°C.)
ASTM D-648
(4) Total light transmittance and haze value
ASTM D-1003
(5) Melt index
ASTM D-1238, 230° C., 10 kg load
(6) Color tone and transparency of injection molded plate
Visual observation
(7) Weathering resistance An accelerated exposure test for 1100 hours by Weather-O-Meter produced by Suga Test Instruments Co., Ltd., under carbon arc lamps, 60° C. and rain fall 12 minutes per hour.

(8) Boiling water resistance

A test piece of 2 mm×50 mm×100 mm was immersed in deionized pure water at 100° C. for 4 hours, and the degree of whitening was judged by visual observation.

(9) Grindability

Using a grinder HD-30W supplied by Kubota Seiki Co., Ltd., a test piece of 2 mm×110 mm×110 mm was ground by pressing it against a grinding stone (a diamond grinding tool, all metal bonded) to evaluate the grindability.

(10) Bending test (break strength, elastic modulus)
ASTM D-790-63
(11) Water absorption
ASTM D-570-63, for 24 hours
(12) Y.I. value (yellowness index)
ASTM D-1925 (transmission method)

While embodiments of the production process of continuous cast sheet are described in Examples 1 to 4 and Comparative Example 1, complemental description on the production process is given below.

In this process, polymerization feedstock is polymerized in a mold which is formed by (i) two continuously moving endless belts which face each other with a definite space being kept between themselves and (ii) two gaskets which move continuously along with the belts while being interposed between the belts. The polymerization feedstock is fed at the upstream end into the cavity of the mold, and at least about 98% of the fed monomers are polymerized before the thus formed cast sheet is withdrawn continuously at the downstream end. An example of the apparatus applicable to this polymerization is described in Japanese Patent Application Laid-Open No. 152512/85. However, the resin composition of the present invention is not limited to the polymer produced by such a polymerization process.

BRIEF DESCRIPTION OF THE DRAWING

The accompanying drawing shows an example of the apparatus applicable to the production of continuous cast sheet according to the present invention. The drawing is an elevation of such a continuous polymerization apparatus employed for the production of continuous cast sheet illustrated in said examples. Principal symbols in the drawing mean as follows:

1,1' - - - Endless belts
2,2',3,3' - - - Main pulleys
4,4',6,6' - - - Carrier rolls
5,5' - - - First polymerization section
7,7' - - - Hot water spray
8,8' - - - Second polymerization section
9,10 - - - Cooling section
11 - - - Carrier rolls
12,12' - - - Rolls
13 - - - Gaskets
14 - - - Cast sheet
15 - - - Device for pouring feedstock

EXAMPLE 1

Figure 1:
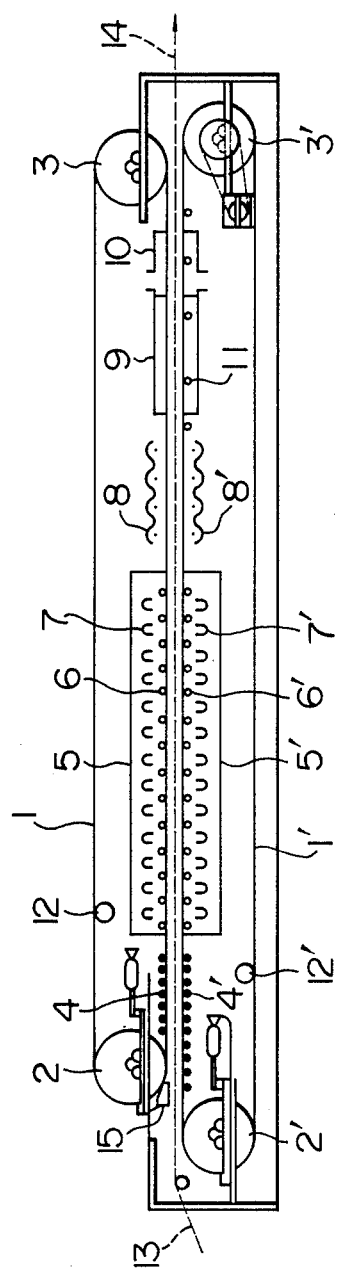

A 50-l autoclave equipped with a stirrer was fed with 27 kg of deionized water, 3 g of a methyl methacrylate/2-sulfoxyethyl methacrylate copolymer as a dispersant, 90 g of sodium sulfate, and 18 kg of a monomeric mixture of 72 parts of methyl methacrylate, 17 parts of N-(o-methylphenyl)maleimide, 10 parts of α-methylstyrene, 1 part of styrene, 0.07 part of n-octyl mercaptan, and 0.5 part of azobisisobutyronitrile. While stirring the mixture at 200 rpm, nitrogen gas was bubbled through it at a rate of 10 l/min for 20 minutes to purge the air from the system. Then, the mixture was heated at 80° C. for 3 hours to effect the suspension polymerization, further was heated to 105° C., maintained at this temperature for 15 minutes, and cooled. Washing the formed precipitate with water and then drying it gave beads of a copolymer (I) having an average particle size of 0.3 mm.

To 35 parts of this copolymer (I) were added 65 parts of methyl methacrylate, 0.05 part of Aerosol OT (a peeling agent supplied by American Cyanamid Co.), 0.05 part of a UV-absorber, and 0.08 part of 2,2'-azobis-2,4-dimethylvaleronitrile and the mixture was stirred to dissolve the copolymer (I). The resulting polymerization feedstock, degassed in vacuo, was fed continuously to a continuous polymerization apparatus as shown in the drawing, and was heated at 75° C. for 1 hour and subsequently at 135° C. for 4 minutes to polymerize the methyl methacrylate, thus yielding a 3-mm thick cast sheet.

Results of evaluating properties of this sheet are shown in Table 1.

EXAMPLE 2

The procedure of Example 1 was followed but using N-(o-chlorophenyl)maleimide in place of N-(o-methylphenyl)maleimide. The evaluation results were as shown in Table 1.

EXAMPLE 3

A 50-l autoclave equipped with a stirrer was fed with 27 kg of deionized water, 3 g of a methyl methacrylate/2-sulfoxyethyl methacrylate copolymer as a dispersant, 90 g of sodium sulfate, and 18 kg of a monomeric mixture of 72 parts of methyl methacrylate, 17 parts of N-cyclohexylmaleimide, 10 parts of α-methylstyrene, 1 part of styrene, 0.07 part of n-octyl mercaptan and 0.5 part of azobisisobutyronitrile. While stirring the mixture at 200 rpm, nitrogen gas was bubbled through it at a rate of 10 l/min for 20 minutes to purge the air from the system. Then the mixture was heated at 80° C. for 4 hours to effect the suspension polymerization, further was heated to 120° C., maintained at this temperature for 30 minutes, and cooled. Washing the formed precipitate with water and drying it gave beads of a copolyin a polymerization yield of 22%, the viscosity of which was 1800 cp at 20° C.

In 100 parts of the thus prepared syrupy polymer-monomer mixture under stirring were dissolved 0.05 part of Aerosol OT, 0.05 part of a UV-absorber (the same as used in Example 1), and 0.08 part of 2,2'-azobis-2,4-dimethylvaleronitrile to prepare a polymerization feedstock. Using this feedstock, a 3-mm thick cast sheet was formed in the same manner as in Example 1.

Results of evaluating properties of the cast sheet are shown in Table 1.

TABLE 1

| Property | Example 1 | Example 2 | Example 3 | Example 4 | Comparative Example 1 |
|---|---|---|---|---|---|
| Appearance (visual observation) | Colorless, transparent | Colorless, transparent | Colorless, transparent | Colorless, transparent | Colorless, transparent |
| Gloss (%) | 104 | 109 | 106 | 109 | 110 |
| Total light transmittance (%) | 90.8 | 91.9 | 91.2 | 91.9 | 93.0 |
| Haze (%) | 1.8 | 1.7 | 2.2 | 1.4 | 0.9 |
| Flexural strength (kg/cm$^2$) | 1072 | 1024 | 1028 | 1104 | 1094 |
| Flexural modulus (kg/cm$^2$) | $3.0 \times 10^4$ | $3.0 \times 10^4$ | $3.0 \times 10^4$ | $3.0 \times 10^4$ | $3.0 \times 10^4$ |
| Heat resistance (HDT, °C.) | 105 | 106 | 107 | 105 | 100 |
| Water absorption (24 hr, %) | 0.3 | 0.3 | 0.3 | 0.3 | 0.3 |
| Boiling resistance | No change | No change | No change | No change | Whitened |
| Weathering resistance | " | " | " | " | " | mer (I) having an average particle size of 0.3 mm.

To 35 parts of this copolymer (I) were added 65 parts of methyl methacrylate, 0.05 part of Aerosol OT, 0.05 part of a UV-absorber, and 0.08 part of 2,2'-azobis-2,4-dimethylvaleronitrile and the mixture was stirred to dissolve the copolymer (I). The resulting polymerization feedstock, degass in vacuo, was fed to the continuous polymerization apparatus shown in the drawing, and was heated at 75° C. for 1 hour and subsequently at 135° C. for 4 minutes to polymerize the methyl acrylate, thus yielding a 3-mm thick cast sheet.

Results of evaluating properties of this sheet are shown in Table 1.

EXAMPLE 4

A 3-mm thick cast sheet was produced by following the procedure of Example 3 except that a monomeric mixture of the following composition was used.

| Composition: | |
|---|---|
| Methyl methacrylate | 85 parts |
| N—Cyclohexylmaleimide | 9 parts |
| α-Methylstyrene | 6 parts |
| n-Octyl mercaptan | 0.15 part |
| Azobisisobutyronitrile | 0.3 part |

Results of evaluating properties of the sheet are shown in Table 1.

Comparative Example 1

A 3000-l vertical tubular reactor equipped with a heating jacket, cooling jacket, condenser, and stirrer was fed with 1000 l of methyl methacrylate alone. The monomer was heated and when its temperature reached 80° C., 0.065% based on the monomer weight of 2,2'-azobis-2,4-dimethylvaleronitrile was added to the monomer under stirring to initiate polymerization. The temperature was raised by polymerization heat to the boiling point of the monomer and the reflux thereof from the condenser began. After 8 minutes from the addition of the polymerization initiator, the reactor was cooled rapidly, giving a syrupy partially polymerized mixture As apparent from Table 1, the methacrylic resin sheets according to the present invention, as compared with the sheet of Comparative Example 1, are greatly improved in heat resistance while comparable in appearance, mechanical properties, water absorption, boiling resistance, and weathering resistance. Thus the present resin composition is useful as methacrylic resin sheets.

EXAMPLES 5 AND 6

Comparative Examples 2 and 3

Beads of a copolymer (I) were prepared in the same manner as in Example 1 by using the same 50-l autoclave but a different composition monomeric mixture of 70 parts of methyl methacrylate, 18 parts of N-(o-methylphenyl)maleimide, 12 parts of α-methylstyrene, 0.05 part of n-octyl mercaptan, 0.5 part of azobisisobutyronitrile, 0.05 part of stearic acid monoglyceride, and 0.1 part of the same UV-absorber.

Beads of a copolymer (II) were also prepared in the same manner as in Example 1 by using the same autoclave but a different composition monomeric mixture of 97 parts of methyl methacrylate, 3 parts of methyl acrylate, 0.22 part of n-octyl mercaptan, 0.1 part of azobisisobutyronitrile, 0.05 part of stearic acid monoglyceride, and 0.1 part of the same UV-absorber.

Pellets were formed by blending these copolymers in varing proportions as shown in Table 2 using a Henschel mixer, and extruding each blend through a 2-vent type of small twin-screw extruder at 250° C. Each group of pellets was injection-molded under the following conditions. Results of evaluating the molded test pieces (110 mm×110 mm×2 mm thick) are shown in Table 3.

Injection molding machine: Screw type automatic injection molding machine, model V-17-65, supplied by Nippon Seikosho Co., Ltd. Injection molding conditions:

Cylinder temperature: 255° C.
Injection pressure: 700 kg/cm$^2$
Mold temperature: 60° C.

Comparative Example 4

Beads of a copolymer (I) were prepared by following the procedure of Example 1 but using a monomeric mixture of 76.9 parts of methyl methacrylate, 2.1 parts of methyl acrylate, 12.6 parts of N-(o-methylphenyl)-maleimide, 8.4 parts of α-methylstyrene, 0.05 part of n-octyl mercaptan, 0.5 part of azobisisobutyronitrile, 0.05 part of stearic acid monoglyceride, and 0.1 part of the same UV-absorber.

These beads were extruded and then injection-molded in the same manner as in Comparative Example 2. Results of the evaluation were as shown in Table 3.

TABLE 2

|  | Copolymer (I) | Methacrylic copolymer (II) |
| --- | --- | --- |
| Comparative Example 2 | 100 | 0 |
| Example 5 | 70 | 30 |
| Example 6 | 30 | 70 |
| Comparative Example 3 | 0 | 100 |

As apparent from Table 3, molded products of resin compositions according to the present invention are superior in heat resistance and comparable in optical properties, mechanical properties, and light resistance to those of the common methacrylic resin (Comparative Example 3). Although the heat resistance can be improved by a method (proposed as Japanese Patent Application No. 262868/84) other than the method of the present invention, it has been found that the resin composition of the present invention is superior in other properties to said proposed copolymer even when the former is identical with the latter in the proportions of all constituents.

late, 0.22 part of n-octyl mercaptan, 0.1 part of azobisisobutyronitrile, 0.05 part of stearyl stearate, and 0.1 part of the same UV-absorber.

Pellets were formed by blending these copolymers in varying proportions as shown in Table 4 using a Henschel mixer, and extruding each blend through a 2-vent type of small twin-screw extruder at 250° C. Each group of pellets was injection-molded under the following conditions. Results of evaluating the molded test pieces (110 mm×110 mm×2 mm thick) are shown in Table 5.

Injection molding machine: Screw type automatic injection molding machine, model V-17-65, supplied by Nippon Seikosho Co., Ltd. Injection molding conditions:

Cylinder temperature: 255° C.
Injection pressure: 700 kg/cm$^2$
Mold temperature: 60° C.

Comparative Example 6

Beads of a copolymer (I) were prepared by following the procedure of Example 3 but using a monomeric mixture of 76.9 parts of methyl methacrylate, 2.1 parts of methyl acrylate, 12.6 parts of N-cyclohexylmaleimide, 8.4 parts of 60-methylstyrene, 0.05 part of n-octyl mercaptan, 0.5 part of azobisisobutyronitrile, 0.05 part of stearic acid monoglyceride, and 0.1 part of the same UV-absorber.

These beads were extruded and injection-molded in the same manner as in Comparative Example 5, and results as shown in Table 5 were obtained.

TABLE 4

|  | Copolymer (I) | Methacrylic copolymer (II) |
| --- | --- | --- |
| Comparative Example 5 | 100 | 0 |
| Example 7 | 70 | 30 |
| Example 8 | 30 | 70 |

TABLE 3

| Property | Comparative Example 2 | Example 5 | Example 6 | Comparative Example 3 | Comparative Example 4 |
| --- | --- | --- | --- | --- | --- |
| Heat distortion temp. (°C.) | 135 | 124 | 111 | 100 | 121 |
| Total light transmittance (%) | 90.4 | 92.0 | 92.4 | 93.0 | 91.3 |
| Haze (%) | 2.9 | 1.4 | 1.2 | 0.9 | 2.1 |
| Y. T. value | 5.6 | 2.7 | 1.9 | 0.5 | 4.3 |
| Tensile strength (kg/cm$^2$) | 414 | 671 | 784 | 760 | 620 |
| Izod impact strength (kg · cm/cm) | 0.7 | 1.4 | 1.7 | 1.7 | 1.3 |
| Color of injection-molded plate (visual observation) | Faint yellow, transparent | Colorless, transparent | Colorless, transparent | Colorless transparent | Faint yellow, transparent |
| Weathering resistance | Yellowing | No change | No change | No change | Yellowing |

EXAMPLES 7 AND 8

Comparative Example 5

Beads of a copolymer (I) were prepared in the same manner as in Example 3 by using the same 50-1 autoclave but a different composition monomeric mixture of 70 parts of methyl methacrylate, 18 parts of N-cyclohexylmaleimide, 12 parts of α-methylstyrene, 0.05 part of n-octyl mercaptan, 0.5 part of azobisisobutyronitrile, 0.05 part of stearic acid monoglyceride, and 0.1 part of the same UV-absorber.

Beads of a copolymer (II) were also prepared in the some manner as in Example 3 by using the same autoclave but a different composition monomeric mixture of 97 parts of methyl methacrylate, 3 parts of methyl acry- As apparent from Table 5, molded products of resin compositions according to the present invention are superior in heat resistance and comparable in optical properties, mechanical properties, and weathering resistance to those of the common methacrylic resin (Comparative Example 3). Although the heat resistance can be improved by a method (proposed as Japanese Patent Application No. 262868/84) other than the method of the present invention, it has been found that the resin composition of the present invention is superior in other properties to said proposed copolymer even when the former is identical with the latter in the proportions of all constituents.

TABLE 5

| Property | Comparative Example 5 | Example 7 | Example 8 | Comparative Example 6 |
| --- | --- | --- | --- | --- |
| Heat distortion temp. (°C.) | 128 | 122 | 110 | 118 |
| Total light transmittance (%) | 90.9 | 92.2 | 92.8 | 91.3 |
| Haze (%) | 2.5 | 1.1 | 0.9 | 2.2 |
| Y. I. value | 3.8 | 1.9 | 1.3 | 3.4 |
| Tensile strength (kg/cm$^2$) | 420 | 718 | 776 | 618 |
| Izod impact strength (kg · cm/cm) | 0.7 | 1.5 | 1.7 | 1.3 |
| Color of injection-molded plate (visual observation) | Faint yellow, transparent | Colorless, transparent | Colorless, transparent | Faint yellow, transparent |
| Weathering resistance | Yellowing | No change | No change | Yellowing |

Comparative Examples 7 and 8

Beads of a copolymer were prepared by following the procedure of Example 1 except that the polymerization was continued for 90 minutes using a monomeric mixture of 70 parts of methyl methacrylate, 30 parts of N-(o-methylphenyl)maleimide, 0.2 part of n-octyl mercaptan, 0.1 part of azobisisobutyronitrile, 0.05 part of stearic acid monoglyceride, and 0.1 part of the same UV-absorber. Containing much unreacted monomers, these beads were washed with methanol, dried, and blended in different ratios as shown in Table 6 with the same methacrylic copolymer (II) as used in Examples 5 and 6. The resulting blends were each extruded and injection-molded, and molded test pieces were evaluated.

TABLE 6

|  | Binary copolymer | Methacrylic copolymer (II) |
| --- | --- | --- |
| Comparative Example 7 | 70 | 30 |
| Comparative Example 8 | 30 | 70 |

Injection-molded test pieces of Comparative Examples 7 and 8 were yellow colored and translucent and the two component polymers were poor in compatibility with each other so that mottles were observed on the test pieces. Thus these test pieces were much inferior in optical properties to those of Examples 5 and 6.

EXAMPLES 9 AND 10

A solution was prepared by mixing 800 g of methyl methacrylate, 50 g of α-methylstyrene, 40 g of p-methylstyrene, 110 g of N-t-butylmaleimide, 1.5 g of t-dodecyl mercaptan, 0.8 g of azobisisobutyronitrile, 0.1 g of Aerosol-OT, and 0.5 g of a UV-absorber. This solution was poured into cell constructed of two glass plates which were 3 mm separated by a gasket, and was set by polymerization in a 65° C. water bath. The time from the immersion of the cell in the water bath until the inner temperature reached a peak was confirmed with a thermocouple inserted in the cell. One hour after this peak time, the cell was taken out of the water bath and heated in an air oven at 130° C. for 2 hours. After cooling, the glass plates were removed to obtain an about 3-mm thick resin sheet. This sheet was crushed in a clean box into pellets of about 3 to 4 mm size. These pellets were blended with a methacrylic resin ("Acrypet VH", supplied by Mitsubishi Rayon Co., Ltd.) in weight ratios as shown in Table 7. Each of the blends was tumbled, then pelletized by extrusion and injection-molded, in the same manner as in Example 5, and evaluation results as shown in Table 7 were obtained.

TABLE 7

| Blending ratio | Example 9 | Example 10 |
| --- | --- | --- |
| Copolymer (I) | 2 | 1 |
| Acrypet VH | 1 | 2 |
| Heat distortion temp. (°C.) | 112 | 107 |
| Total light transmittance (%) | 92.4 | 92.6 |
| Haze (%) | 1.8 | 0.9 |
| Y. I. value | 1.8 | 1.4 |
| Tensile strength (kg/cm$^2$) | 742 | 773 |
| Izod impact strength (kg · cm/cm) | 1.5 | 1.7 |
| Color of injection molded plate (visual observation) | Colorless, transparent | Colorless, transparent |
| Weathering resistance | No change | No change |

EXAMPLE 11

Beads of a copolymer (I) were prepared by following the procedure of Example 1 but using a monomeric mixture of 79 parts of methyl methacrylate, 12 parts of N-(o-chlorophenyl)maleimide, 8 parts of α-methylstyrene, 1 part of ethyl acrylate, 0.12 part of n-octyl mercaptan, and 0.35 part of azobisisobutyronitrile. These beads were blended with an equal amount of Acrypet VH (mentioned above) in a Henschel mixer and pelletized by extrusion in the same manner as in Example 3.

Lenses of 3 mm center thickness were molded from the obtained pellets. The lens was transparent, showed no coloration, little optical strain, and good mold-shape reproducibility, and was found to be fit for use at 100° C. The perimetric portion of the lens was evaluated for grindability with the result that no adhesion of polymer was observed, proving the good grindability.

Injection-molded test pieces of this resin composition were also evaluated similarly to Example 5. Results of the evaluation were as follows:

| Heat resistance (HDT) | 113° C. |
| --- | --- |
| Total light transmittance | 92.4% |
| Haze | 0.9 |

EXAMPLE 12

Pellets of a copolymer (I) were prepared by following the procedure of Example 9 but using N-phenylmaleimide in place of N-t-butylmaleimide.

Pellets of a copolymer (II) were also prepared by following the procedure of Example 9 except that a monomeric mixture of 770 g of methyl methacrylate, 120 g of styrene, 100 g of maleic anhydride, 10 g of methyl acrylate, 3.5 g of lauroyl peroxide, 0.4 g of a peeling agent (JP-504, supplied by Johoku Kagaku Co., Ltd.), and 0.5 g of the same UV-absorber was polymerized to rigid form in the water bath at 76° C.

The copolymers (I) and (II) were blended together in equal proportions in a Henschel mixer, and evaluated in the same manner as in Example 3. Results of the evaluation were as follows:

| | |
|---|---|
| Heat distortion temperature | 118° C. |
| Total light transmittance | 90.8% |
| Haze | 1.9% |
| Tensile strength (kg/cm$^2$) | 728 |
| Izod impact strength (kg · cm/cm) | 1.2 |
| Color of injection molded plate (visual observation) | Transparent, Slightest yellowing |

EXAMPLES 13 AND 14

Pellets of a copolymer (I) were prepared by following the procedure of Example 9 but changing N-t-butylmaleimide to N-cyclohexylmaleimide. These pellets were blended with Acrypet VH in mixing ratios as shown in Table 8. In the same manner as in Example 9, each of the blends was pelletized by extrusion and injection-molded. Found properties of the injection-molded test pieces are shown in Table 8.

TABLE 8

| Blending ratio | Example 13 | Example 14 |
|---|---|---|
| Copolymer (I) | 2 | 1 |
| Acrypet VH | 1 | 2 |
| Heat distortion temp. (°C.) | 113 | 108 |
| Total light transmittance (%) | 92.4 | 92.6 |
| Haze (%) | 1.5 | 0.9 |
| Y. I. value | 1.6 | 1.3 |
| Tensile strength (kg/cm$^2$) | 756 | 769 |
| Izod impact strength (kg · cm/cm) | 1.5 | 1.7 |
| Color of injection-molded plate (visual observation) | Colorless, transparent | Colorless, transparent |
| Light resistance | No change | No change |

EXAMPLE 15

Beads of a copolymer (I) were prepared by following the procedure of Example 1 but using a monomeric mixture of 79 parts of methyl methacrylate, 12 parts of N-cyclohexylmaleimide, 8 parts of α-methylstyrene, 1 part of ethyl acrylate, 0.12 part of n-octyl mercaptan, and 0.35 parts of azobisisobutyronitrile. These beads and Acrypet VH (mentioned above) were blended together in equal proportions in a Henschel mixer. The blend was pelletized by extrusion in the same manner as in Example 3.

Lenses of 3 mm center thickness were molded from the obtained pellets. The lens was transparent, showed no coloration little optical strain, and good mold-shape reproducibility, and was found to be fit for use at 100° C. The perimetric portion of the lens was evaluated for grindability with the result that no adhesion of polymer was observed, proving the good grindability.

Injection-molded test pieces of this resin composition were also evaluated similarly to Example 5. Results of the evaluation were as follows:

| | |
|---|---|
| Heat resistance (HDT) | 111° C. |
| Total light transmittance | 92.8% |
| Haze | 0.8 |

EXAMPLE 16

Pellets of a copolymer (II) were prepared by following the procedure of Example 13 except that a monomeric mixture of 770 g of methyl methacrylate, 120 g of styrene, 100 g of maleic anhydride, 10 g of methyl acrylate, 3.5 g of lauroyl peroxide, 2.2 g of n-octyl mercaptan, 0.4 g of a pelling agent (JP-504, supplied by Johoku Kagaku Co., Ltd.), and 0.5 g of the same UV-absorber was polymerized to rigid form in a water bath at 76° C.

The same copolymer (I) as used in Example 13 was blended with an equal amount of this copolymer (II) in a Henschel mixer, and evaluated in the same manner as in Example 7. Results of the evaluation were as follows:

| | |
|---|---|
| Heat distortion temperature (°C.) | 117 |
| Total light transmittance (%) | 92.2 |
| Haze (%) | 1.6 |
| Tensile strength (kg/cm$^2$) | 703 |
| Izod impact strength (kg · cm/cm) | 1.2 |
| Color of injection-molded plate (visual observation) | Pale yellow, transparent |

EXAMPLE 17

A solution was prepared by mixing 65 parts of methyl methacrylate, 20 parts of a methacrylic resin (Acrypet VH), 6 parts of α-methylstyrene, 9 parts of N-cyclohexylmaleimide, 0.2 part of lauroyl peroxide, and 0.01 part of Aerosol OT. Then an about 3-mm thick cast sheet was made from the solution in the same manner as in Example 9. Results of evaluating properties of this resin sheet were as shown in Table 9.

Comparative Example 9

The procedure of Example 17 was followed except that methyl methacrylate was used in place of α-methylstyrene and N-cyclohexylmaleimide. The results were as shown in Table 9.

EXAMPLE 18

The procedure of Example 17 was followed except that N-(o-chlorophenyl)maleimide was used in place of N-cyclohexylmaleimide. The result were as shown in Table 9.

Comparative Example 10

A solution was prepared by mixing 70 parts of methyl methacrylate, 20 parts of a methacrylic resin (Acrypet VH), 10 parts of N-cyclohexylmaleimide, 0.2 part of lauroyl peroxide, and 0.01 part of Aerosol OT. Thereafter the procedure of Example 17 was followed, and results as shown in Table 9 were obtained.

TABLE 9

| Property | Example 17 | Comparative Example 9 | Example 18 | Comparative Example 10 |
|---|---|---|---|---|
| Heat distortion temp. (°C.) | 124 | 101 | 126 | 115 |
| Total light transmittance (%) | 92.8 | 93.0 | 92.2 | 92.0 |
| Haze (%) | 0.9 | 0.4 | 1.3 | 2.1 |
| Y. I. value | 1.5 | 0.9 | 2.1 | 2.1 |

TABLE 9-continued

| Property | Example 17 | Comparative Example 9 | Example 18 | Comparative Example 10 |
| --- | --- | --- | --- | --- |
| Flexural strength (kg/cm$^2$) | 1204 | 1170 | 1128 | 1079 |

EFFECT OF THE INVENTION

The resin composition of the invention is superior in heat resistance to poly(methyl methacrylate) while retaining excellent mechanical properties, weather resistance, and processability comparable to those of poly(methyl methacrylate).

Having such characteristics, the present resin composition is useful in the following application fields: Fields of sign boards, illumination covers, nameplates, automobile parts, electrical parts, ornaments, miscellaneous goods, etc., where acrylic resins are in use; in particular, fields where high heat resistance is required for such resins.

For optical elementary devices, particularly for lenses, the present resin composition can be used advantageously with high dimensional stability in a wider variety of environments than common methacrylic resins can be, because the present resin composition has a high refractive index, high heat stability, and low hygroscopicity and is superior in surface properties necessary for lenses and in processability. Such optical elementary devices include, for example, pickup lenses, eye-glasses, camera lenses, and projector Fresnel lenses and moreover, base plates of optical disks and cores and claddings of optical fibers.

What is claimed is:

1. A heat-resistant methacrylic resin composition comprising 1 to 99% by weight of a copolymer (I) obtained by polymerizing a monomer mixture of 40 to 98% by weight of methyl methacrylate, 1 to 30% by weight of an N-cyclohexyl maleimide, and 1 to 30% by weight of an aromatic vinyl monomer and 99 to 1% by weight of a copolymer (II) containing at least 70% by weight of methyl methacrylate.

2. The heat-resistant methacrylic resin composition of claim 1, wherein the aromatic vinyl monomer is at least one member selected from the group consisting of styrene, α-methylstyrene, and vinyltoluene.

3. The heat-resistant methacrylic resin composition of claim 1, wherein the molar ratio ($\beta/\alpha$) is from 0.5 to 2 where $\alpha$ is the amount of the N-cyclohexyl maleimide in the copolymer (I) and $\beta$ is the amount of the aromatic vinyl monomer therein.

4. The heat-resistant methacrylic resin composition of claim 1 comprising 10 to 90% by weight of the copolymer (I) and 90 to 10% by weight of the copolymer (II).

5. The heat-resistant methacrylic resin composition of claim 1 comprising 1 to 85% by weight of the copolymer (I) and 85 to 15% by weight of the copolymer (II).

6. The heat resistant methacrylic resin composition of claim 1 comprising 20 to 80% by weight of the copolymer (I) and 80 to 20% by weight of the copolymer (II).

* * * * *